(12) United States Patent
Smart et al.

(10) Patent No.: US 12,385,604 B2
(45) Date of Patent: Aug. 12, 2025

(54) RE-COUPING ACTUATING MEDIA USED TO OPERATE A CONTROL VALVE

(71) Applicant: Dresser, LLC, Houston, TX (US)

(72) Inventors: Harold Randall Smart, Portsmouth, RI (US); John Dee Kelley, Houston, TX (US); Chengbao Wang, Oklahoma City, OK (US); Vinh Do, Edmond, OK (US); Melissa Gayle Allin, Oklahoma City, OK (US)

(73) Assignee: Dresser, LLC, Houston, TX (US)

( * ) Notice: Subject to any disclaimer, the term of this patent is extended or adjusted under 35 U.S.C. 154(b) by 210 days.

(21) Appl. No.: 17/899,822

(22) Filed: Aug. 31, 2022

(65) Prior Publication Data

US 2024/0068626 A1     Feb. 29, 2024

(51) Int. Cl.
| | | |
|---|---|---|
| *F17D 5/02* | (2006.01) | |
| *F16K 31/12* | (2006.01) | |
| *F17C 13/04* | (2006.01) | |

(52) U.S. Cl.
CPC ............... *F17D 5/02* (2013.01); *F16K 31/12* (2013.01); *F17C 13/04* (2013.01); *F17C 2205/0323* (2013.01); *F17C 2205/0338* (2013.01); *F17C 2221/033* (2013.01); *F17C 2227/0135* (2013.01); *F17C 2250/032* (2013.01); *F17C 2250/043* (2013.01)

(58) Field of Classification Search
CPC ......... Y10T 137/5762; Y10T 137/5907; Y10T 137/86002; Y10T 137/85986; F16K 31/12; F17C 13/04; F17C 2205/0323; F17C 2205/0338; F17C 2221/033; F17C 2227/0135; F17C 2250/032; F17C 2250/043

USPC ................................................. 251/61–63.6
See application file for complete search history.

(56) References Cited

U.S. PATENT DOCUMENTS

| | | | | |
|---|---|---|---|---|
| 2,438,245 A | * | 3/1948 | Gregg ...................... | F15B 1/26 60/455 |
| 3,186,346 A | * | 6/1965 | Hope .................... | F04D 29/106 415/168.2 |
| 3,307,574 A | * | 3/1967 | Anderson ............. | F16K 31/122 277/516 |

(Continued)

FOREIGN PATENT DOCUMENTS

| | | |
|---|---|---|
| CN | 113531282 A | 10/2021 |
| JP | 09-41905 A | 2/1997 |

(Continued)

OTHER PUBLICATIONS

Chhibber et al., "Methods for reducing fugitive emissions from natural gas compression stations," Nov. 2020.

(Continued)

*Primary Examiner* — Jessica Cahill
(74) *Attorney, Agent, or Firm* — Paul Frank + Collins P.C.

(57) ABSTRACT

A recovery unit configured to re-inject lost or fugitive emissions back into a pipeline. These configuration may include a pressure vessel that can hold gas (or other fluid) that might vent to atmosphere from, for example, a valve or like flow control. A pump may couple with the pressure vessel. In use, this pump can draw fluid out of the pressure vessel and pressurize it to inject back into the pipeline, typically downstream of the valve. The pump may utilize upstream pressure as a power source.

10 Claims, 6 Drawing Sheets

(56) References Cited

U.S. PATENT DOCUMENTS

| | | | | |
|---|---|---|---|---|
| 4,187,817 | A * | 2/1980 | Wilson | F02D 1/065 |
| | | | | 123/457 |
| 4,573,344 | A * | 3/1986 | Ezekoye | G01P 13/0066 |
| | | | | 73/40.5 R |
| 4,901,751 | A * | 2/1990 | Story | H01H 35/2671 |
| | | | | 73/40 |
| 8,066,023 | B2 | 11/2011 | Hoffart | |
| 8,082,939 | B2 * | 12/2011 | Sears | F04D 29/124 |
| | | | | 415/168.2 |
| 8,100,671 | B2 * | 1/2012 | Botros | F04F 5/18 |
| | | | | 417/174 |
| 10,247,179 | B2 | 4/2019 | Nagura et al. | |
| 10,429,067 | B2 | 10/2019 | Salu et al. | |
| 10,683,742 | B2 | 6/2020 | Elmer | |
| 11,835,183 | B1 * | 12/2023 | Figueroa | F17D 5/005 |
| 2003/0098065 | A1 * | 5/2003 | Dilger | G01M 3/224 |
| | | | | 137/312 |
| 2008/0135105 | A1 * | 6/2008 | Lacza | B29C 45/82 |
| | | | | 264/299 |
| 2008/0251129 | A1 * | 10/2008 | Hoffart | F25J 1/0279 |
| | | | | 137/312 |
| 2013/0170961 | A1 | 7/2013 | Meucci et al. | |
| 2015/0252946 | A1 * | 9/2015 | Varani | F17C 1/00 |
| | | | | 137/224 |

FOREIGN PATENT DOCUMENTS

| | | |
|---|---|---|
| JP | 2001-248756 A | 9/2001 |
| JP | 2011052620 A | 3/2011 |
| JP | 5059662 B2 | 10/2012 |

OTHER PUBLICATIONS

Climate and Clean Air Coalition (CCAC), "Technical Guidance Document Number 4: Reciprocating Compressors Rod Seal/Packing Vents," 2017.

* cited by examiner

RE-COUPING ACTUATING MEDIA USED TO OPERATE A CONTROL VALVE

BACKGROUND

Flow controls play a significant role in many industrial settings. Power plants and industrial process facilities, for example, use different types of flow controls to manage flow of material, typically fluids, throughout vast networks of pipes, tanks, generators, and other equipment. Oil and gas facilities may employ pneumatic or electro-pneumatic control valves to regulate flow of hydrocarbons, like natural gas. These facilities may direct line pressure to the control valve as operating or "actuating" media for an onboard pneumatic actuator. This feature is advantageous in remote locations because power, like electricity, may be scarce or in short supply. However, while convenient, the flow control may often bleed or vent this actuating media directly to atmosphere as part of normal valve operation.

SUMMARY

The subject matter of this disclosure relates to improvements to recoup most, if not all, of this "lost" actuating media. Of particular interest are embodiments that can collect and re-inject actuating media back into facility pipelines (or other parts of the facility systems or networks). These embodiments can use pressure differential across the flow control to boost pressure of the actuating media to levels found downstream of the flow control. This feature can prevent loss of product and reduce emissions of greenhouse gases.

DRAWINGS

This specification refers to the following drawings.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the examples shown in drawings noted above. These features can improve operator compliance and revenue. Operators are keen to reduce lost product as much as possible. They are also under significant pressure to reduce carbon or hydrocarbon (or greenhouse) emissions in order to meet local regulations or, generally, to be good stewards for the environment. As noted herein, the examples show fluid circuits that can capture fluids, like natural gas, from various locations along an operator's pipeline networks. These circuits prevent this natural gas from the atmosphere and, in fact, can re-inject the natural gas back into the pipeline network as part of normal processing operations. Other embodiments are within the scope of this disclosure.

Figure 1:
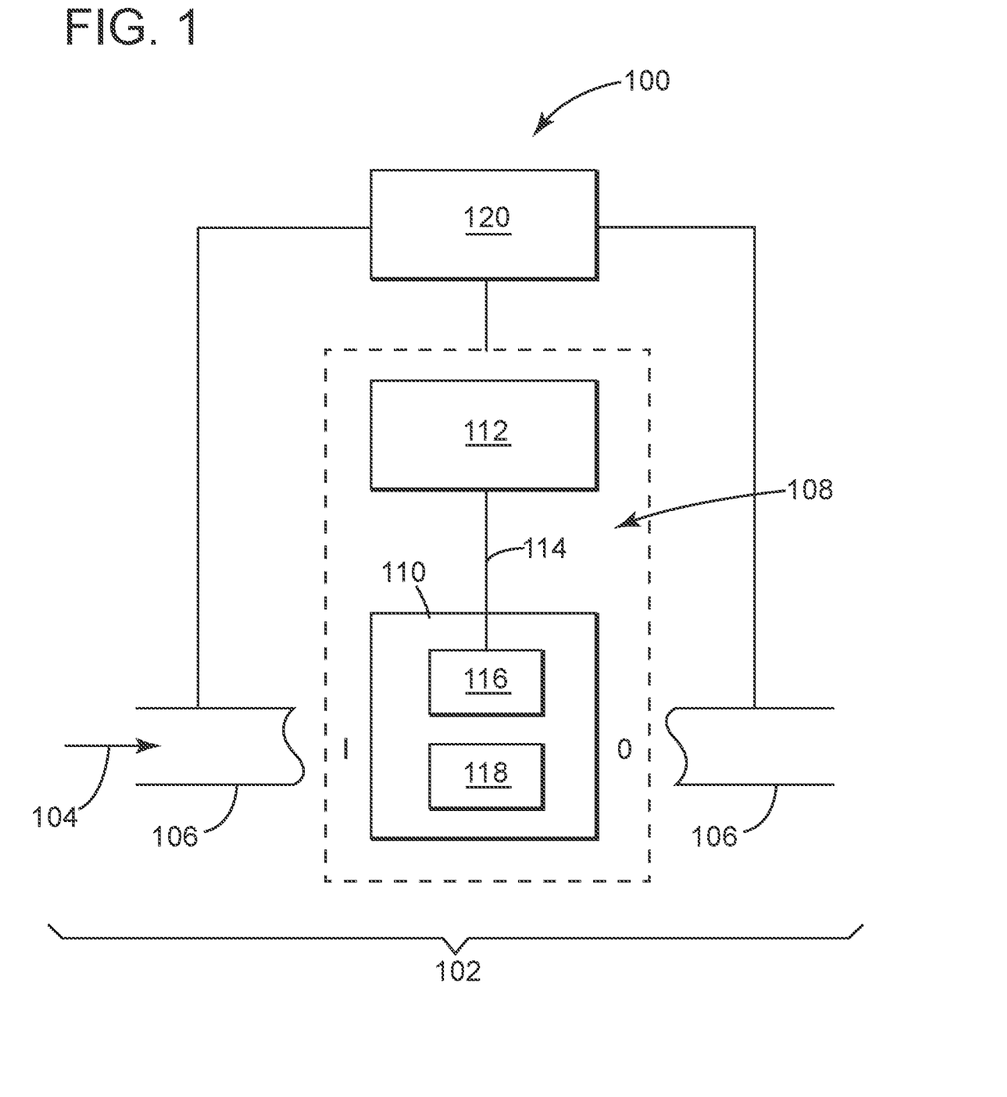
FIG. 1 depicts a schematic diagram of a recovery unit.

FIG. 1 depicts an example of a recovery unit 100. This example is found in a distribution network 102, typically designed to carry material 104 through a network of conduit 106. The network 102 may include a flow control 108 that has a valve body 110 to connect in-line with the conduit 106. The device may also have an actuator 112. A valve stem 114 may extend from the actuator 112 to locate a closure member 116 in position proximate a seat 118. In one implementation, the recovery unit 100 may have a fluid circuit 120 that couples to conduit 106 on both sides of the flow control 108.

Broadly, the recovery unit 100 may be configured to recoup gas often lost to atmosphere. These configurations may incorporate parts that can operate on this "lost" gas. These parts may, for example, capture the lost gas, like fugitive emissions or gas bled during normal process operations. The parts may also increase pressure of the captured gas to allow operators to re-insert the pressurized gas back into their process. These features are beneficial because operators both prevent direct emission of greenhouse gasses and realize revenue from the "re-injected" gas.

The distribution system 102 may be configured to deliver or move resources. These configurations may embody vast infrastructure. Material 104 may comprise gases, liquids, solids, or mixes, as well. The conduit 106 may include pipes or pipelines, often that connect to pumps, boilers, and the like. The pipes may also connect to tanks or reservoirs. In many facilities, this equipment forms complex networks.

The flow control 108 may be configured to regulate flow of material 104 through the conduit 106 in these complex networks. These configurations may include control valves and like devices. The valve body 110 in such devices is often made of cast or machined metals. This structure may form a flange at openings I, O. Adjacent pipes 106 may connect to these flanges. The actuator 112 may include a pneumatic cylinder that requires compressed or pressurized gas and operate in concert with a piston, spring (or springs), or a flexible diaphragm, to generate a load. The valve stem 114 may form an elongate cylinder or rod that directs this load to the closure member 116, which is often a cylindrical block or plug. The load can manage position of the plug to prevent flow through an opening in the seat 118.

The fluid circuit 120 may be configured to couple with pressure upstream and downstream of the flow control 108. These configurations may include devices that can hold or retain material 104. Other devices may pressurize material 104. Together, the devices can form a system that can flow material 104 back into the distribution system 102.

Figure 2:
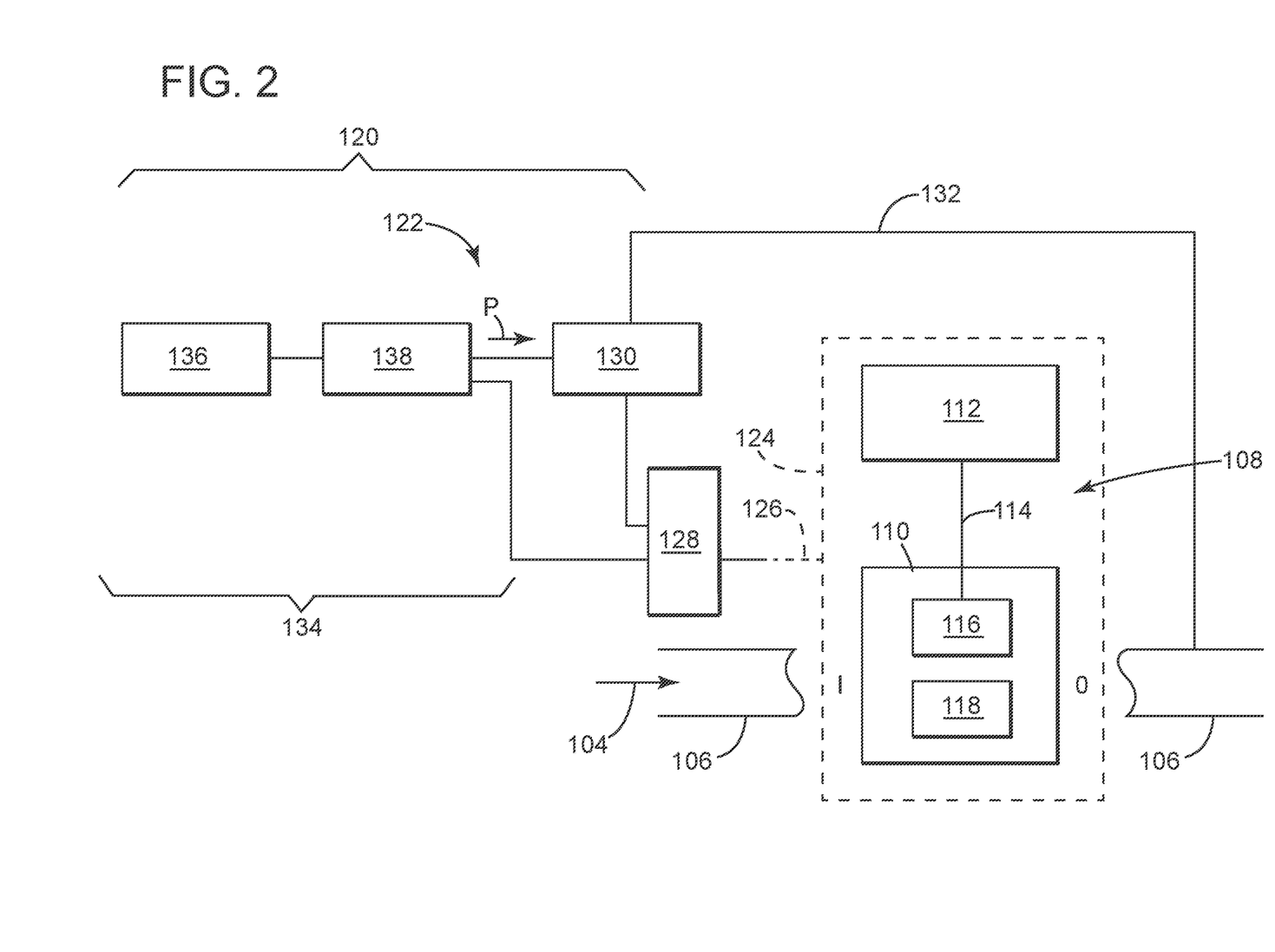
FIG. 2 depicts a schematic diagram of an example of a fluid circuit for use in the recovery unit.

FIG. 2 depicts a schematic diagram of an example of the fluid circuit 120. This example includes a recovery circuit 122 with components, for example, an interface 124 and a line 126. The components 124, 126 may direct gas from in or around the flow control 108 to a pressure vessel 128, like a tank or reservoir. In one implementation, the interface 124 may form an envelope around all or parts of the flow control 108. The envelope may capture "fugitive" gas from the device, for example, from packing, exhaust ports, or other areas that may vent to atmosphere. This fugitive gas may transit the line 126 into the pressure vessel 128. A pump 130 may couple the pressure vessel 128 with an injection line 132 that connects to the conduit 106 on the downstream side of the flow control 108. The pump 130 may require power, for example, an electric or pneumatic source. A control circuit 134 may couple with the pump 130. The control circuit 134 may include a power source 136, like a battery or power main that is available on site. The power source 136 may energize a controller 138. In one implementation, the controller 138 may receive feedback that defines operating parameters for the fluid circuit 120. These operating parameters may include, for example, "tank" pressure, which corresponds with pressure of the fluid in the pressure vessel 128. The controller 138 may compare the pressure to a threshold value. Pressure at or in excess of the threshold value may cause the controller 138 to generate a signal P that activates the pump 130. The signal P may embody current or voltage. These signals can regulate a state of the pump 130. In its "on" or operative state, the pump 130 may draw fugitive gas from the pressure vessel 128. The pump 130 may increase pressure of the fugitive gas, for example, to allow it to flow back through the injection line 132 into the conduit 106 at the same or similar pressure as found downstream of the flow control 108. The controller 138 may turn the pump 130 to its "off" or non-operative state, for example, in response to tank pressure that is at or below the threshold value. This state allows fugitive gas to fill the pressure vessel 128.

Figure 3:
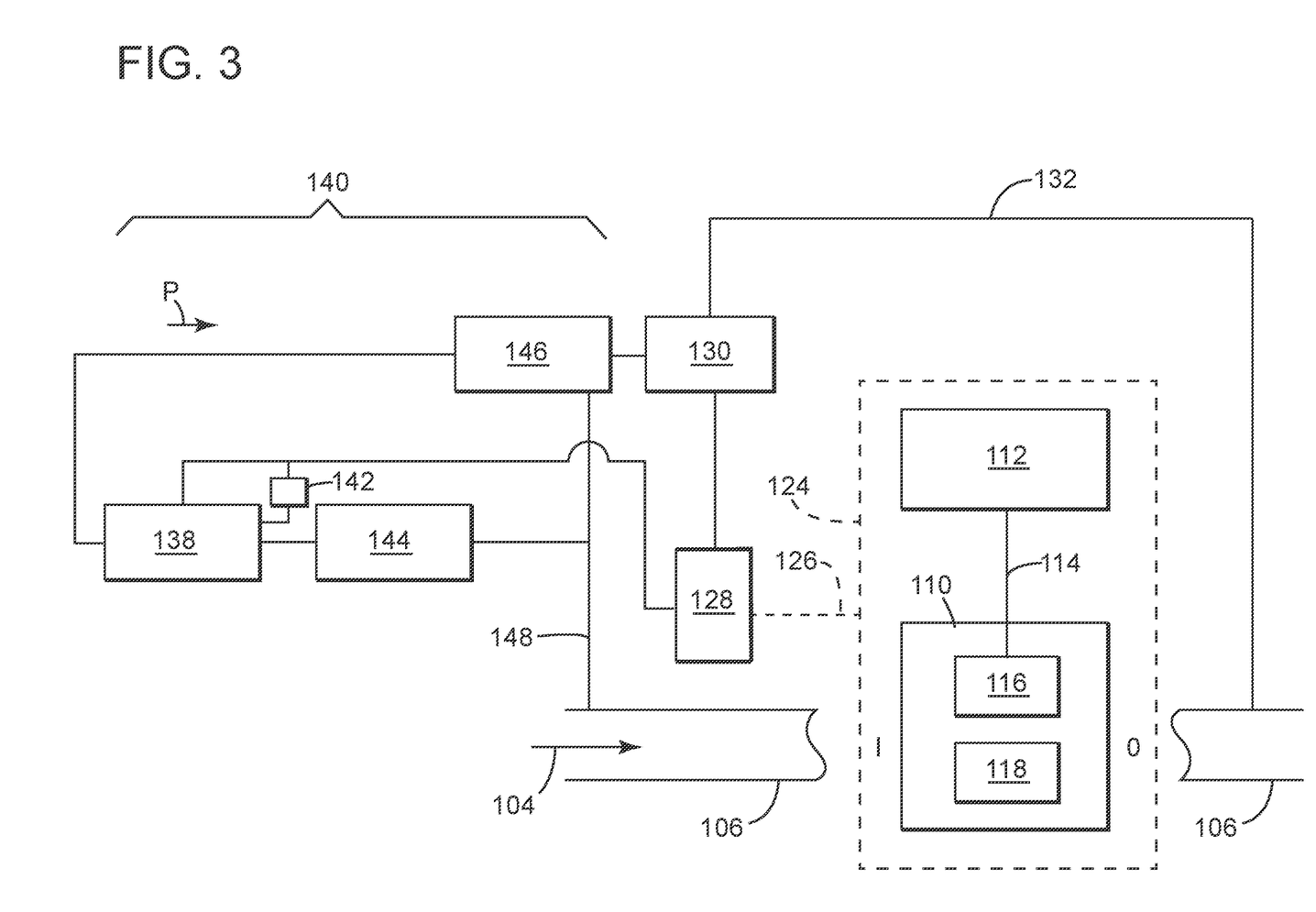
FIG. 3 depicts a schematic diagram of an example of a fluid circuit for use in the recovery unit.

FIG. 3 depicts a schematic diagram of another example of the fluid circuit 120. The pump 130 may embody a pneumatic pump that requires pneumatic logic 140 with flow components, like a check valve 142, a pressure regulator 144, or a valve 146. The components 144, 146 may connect to a source line 148 that carries pressure from the conduit 106 that connects to the upstream side of the flow control 108. Pressure may act to power or operate the pneumatic pump 130. In one implementation, the controller 138 can manipulate the signal P in response to the relationship between the tank pressure and a threshold value. This feature may change the state of the valve 146 between its "open" state and its "closed" state. The open state may allow pressure to energize the pneumatic pump 130, for example, to draw fugitive gas out of the pressure vessel 128, pressurize it, and inject it back through the injection line 132 into the conduit 106 at the same or similar pressure as found downstream of the flow control 108. The closed state may prevent pressure from the pneumatic pump 130. This feature may turn the pump off to allow fugitive gas to fill the pressure vessel 128.

Figure 4:
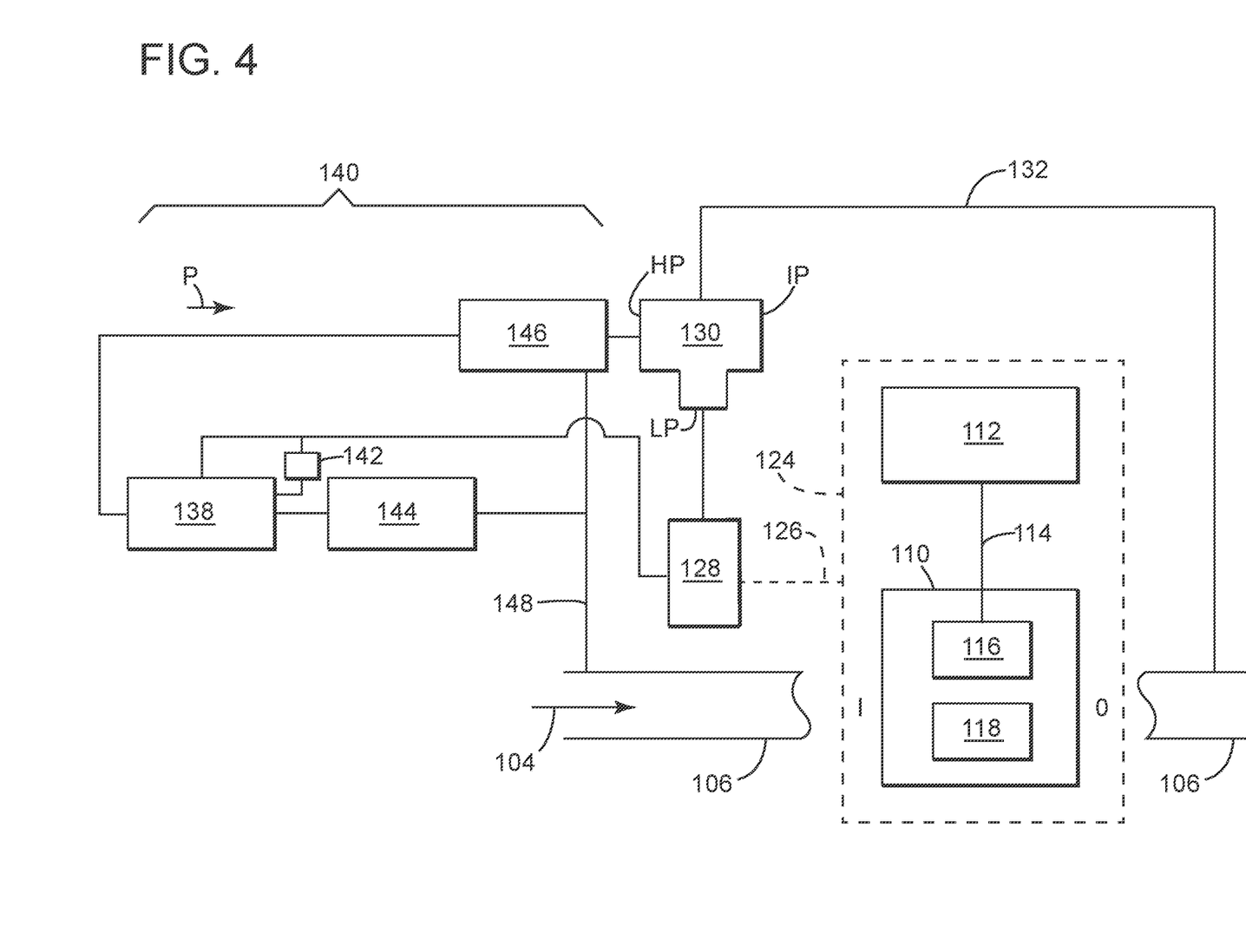
FIG. 4 depicts a schematic diagram of an example of the fluid circuit for use in the recovery unit

FIG. 4 depicts a schematic diagram of another example of the fluid circuit 120. The pump 130 may embody an ejector or like vacuum pump. The ejector 130 may include a higher pressure inlet (HP) that couples with the valve 146. A low pressure inlet (LP) may couple with the pressure vessel 128. In use, high pressure flow through the ejector 130 can generate a vacuum that draws fluid from the pressure vessel 128 into the device. This feature evacuates the pressure vessel 128. The device may be further configured to mix the high pressure flow and the low pressure flow together. This combined flow exists the ejector 130 at its intermediate pressure outlet (IP) and inject it back through the injection line 132 into the conduit 106 at the same or similar pressure as found downstream of the flow control 108.

Figure 5:
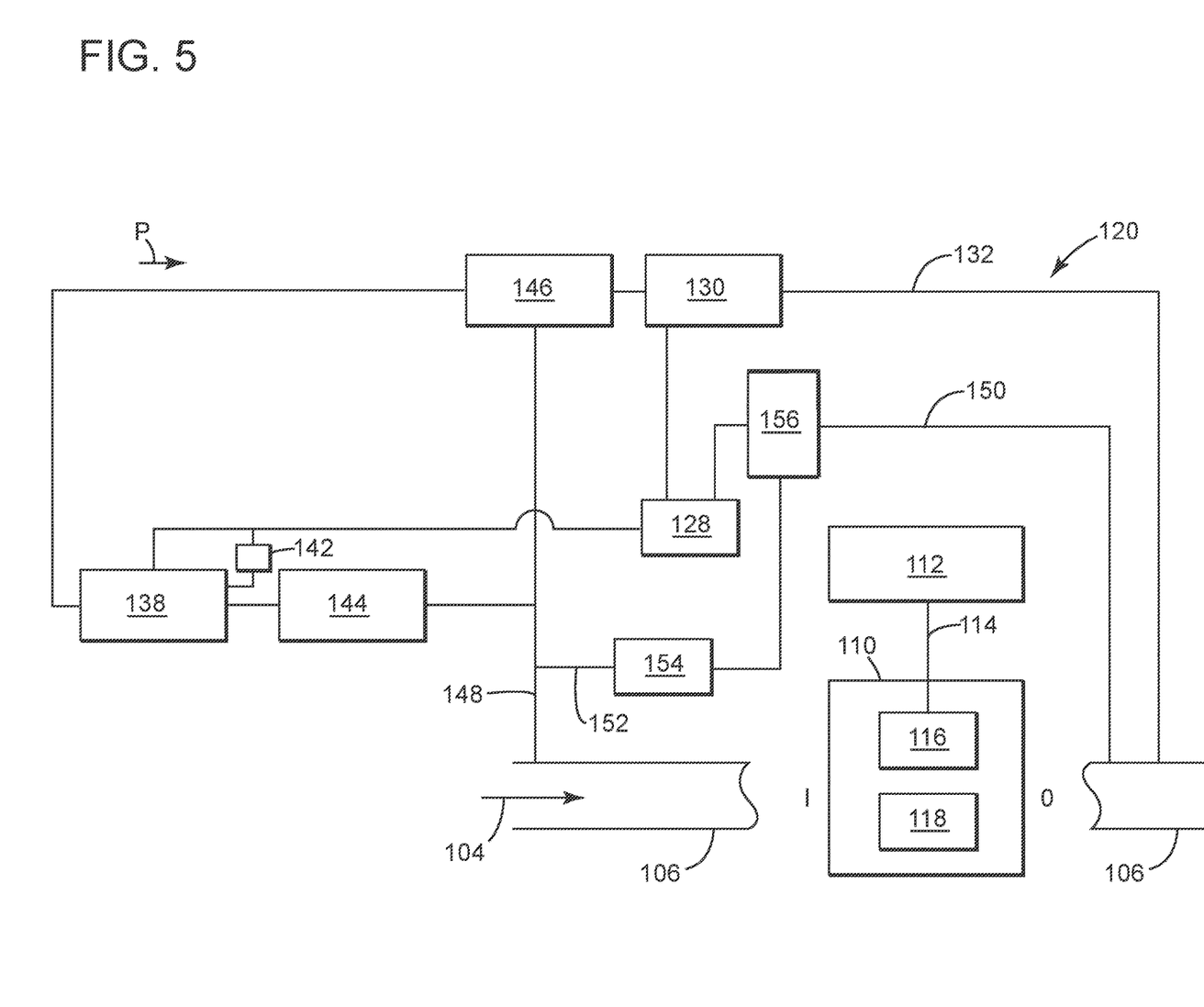
FIG. 5 depicts a schematic diagram of an example of the fluid circuit of FIG. 3.

FIG. 5 depicts a schematic diagram of an example of the fluid circuit 120 of FIG. 3. This example includes a sense line 150 and an instrument line 152 with a pressure regulator 154. Both lines 150, 152 may couple with a valve instrument 156. The sense line 150 may couple the valve instrument 156 with the conduit 106 on the downstream side of the flow control 108. This arrangement may provide feedback on downstream pressure, for example, which is important to regulate position of the closure member 116 to ensure appropriate flow of material 104 through the device. The instrument line 152 may allow pressure from the upstream side of the flow control 108 to operate the actuator 112. In one implementation, the pressure regulator 154 may significantly reduce pressure of incoming gas, for example, from 1000 psi to around 120 psi for use at the flow control 108.

Figure 6:
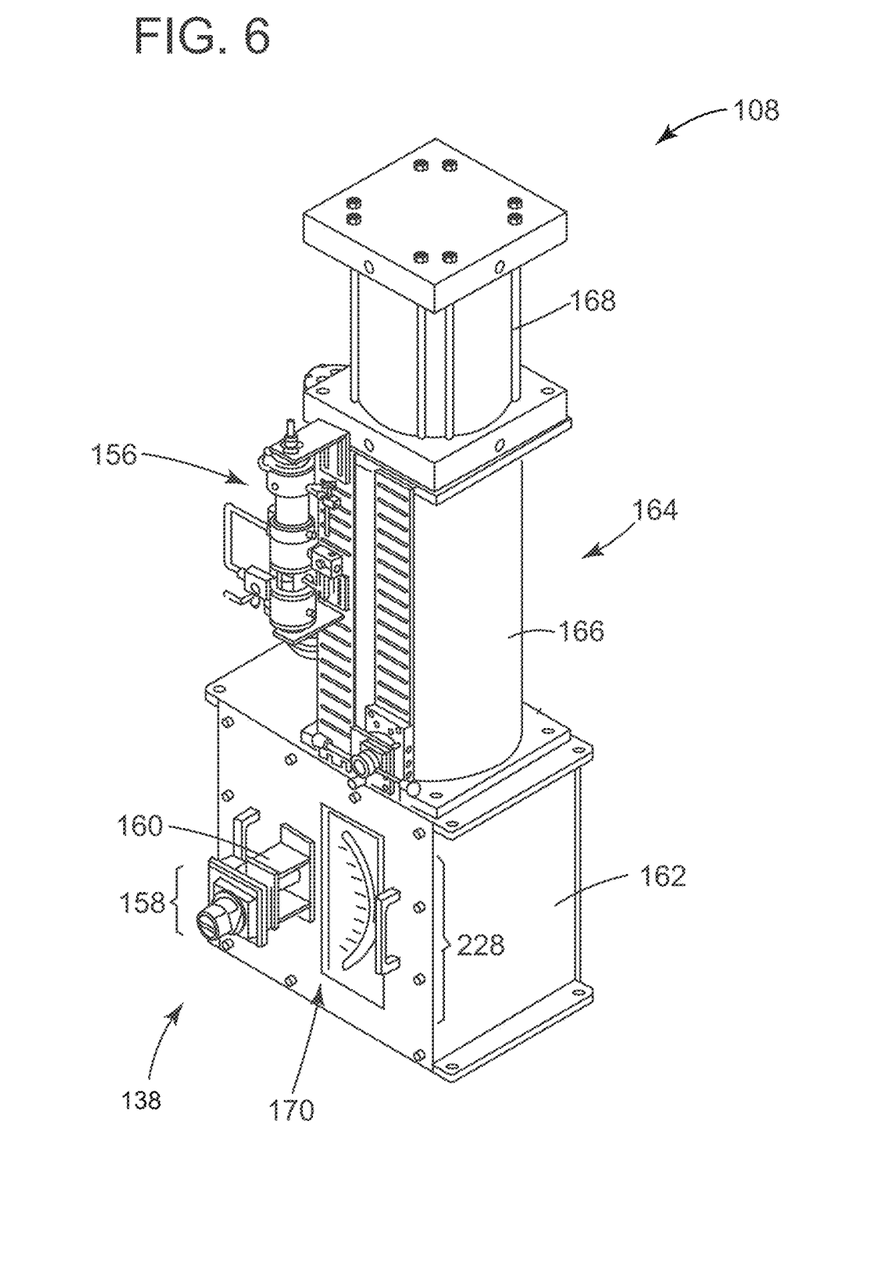
FIG. 6 depicts an example of a flow control.

FIG. 6 depicts a perspective view of exemplary structure for the flow control 108. This structure may include a valve travel sensor 158 that affixes to a mount 160. The mount 160 may couple to a base 162, for example, by way of fasteners F, like screws or bolts. The base 162 can support the valve body 110. As also shown, the base 162 may support a load generator 164 that may include a spring cartridge 166 and a pneumatic cylinder 168. In one implementation, the valve instrument 156 may embody a controller that senses downstream pressure. The controller 156 may act on the pneumatic cylinder 168 to position the closure member 116 (FIG. 1) in its correct location to maintain downstream pressure at a desired or pre-determined level. Other components, like a travel scale 170, may also secure to the base 162. The travel scale 170 may embody part of a mechanical indicator with one or more piece parts that mount to or integrate as machined features into the base 162. However, this disclosure also contemplates use of display technology (e.g., screens, displays, etc.) that could provide some type of visual interface for the observer to realize the movement or position of the closure member 116 (FIG. 1).

In view of the foregoing, the improvements herein reduce the amount of natural gas (or other actuating media) that flow controls vent to atmosphere. These improvements may bring operators into compliance with local regulations or standards. As an added benefit, the proposed designs can re-inject fugitive gas back into the facility pipeline. This feature allows operators to monetize product that is often "lost" as part of normal process or facility operations.

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:
1. A recovery unit, comprising:
a recovery circuit having an interface to capture fluid from an envelope disposed around a first valve;
a pressure vessel coupled with the recovery circuit;

a pump coupled with the pressure vessel, the pump configured to draw fluid from the pressure vessel and generate a stream at a pressure that corresponds with pressure downstream of the first valve; and a control circuit coupled with the pressure vessel and the pump, the control circuit comprising:

a controller, a second valve interposed between the controller and the pump, and a pressure regulator coupled to an upstream side of the controller, wherein the control circuit configured to generate a signal to activate and deactivate the pump in response to pressure in the pressure vessel.

2. The recovery unit of claim 1, wherein the control circuit comprises a second valve interposed between the controller and the pump.

3. The recovery unit of claim 1, further comprising:

an injection line coupled on a first end with the pump to receive the stream, the injection line configured with a second end to couple with a conduit coupled with a downstream side of the first valve.

4. The recovery unit of claim 1, wherein the pump comprises an ejector.

5. A system, comprising:

a pressure vessel having a connection that can interface with part of a first valve, the connection configured to direct fugitive gas emission from the part of the first valve into the pressure vessel; and a pumping system coupled with the pressure vessel, the pumping system comprising a pump and a control circuit that operates the pump, the control circuit comprising:

a controller, a second valve interposed between the controller and the pump, and a pressure regulator coupled to an upstream side of the controller, wherein the control circuit is configured to generate a signal in response to feedback from the pressure vessel, the signal causing the pump to discharge a stream that comprises fluid from the pressure vessel.

6. The system of claim 5, wherein the signal opens or closes a second valve.

7. A method, comprising:

directing fugitive emissions from a first valve into a pressure vessel;

energizing a pump in response to pressure in the pressure vessel;

directing a stream from the pump into a downstream side of the first valve disposed as part of a pipeline; and directing fluid from an upstream side of the first valve to the pump.

8. The method of claim 7, further comprising:

actuating a second valve to allow the fluid to flow to the pump.

9. The method of claim 7, wherein the stream is at a pressure that corresponds with pressure of fluid in the pipeline.

10. The method of claim 7, wherein the pump comprises an ejector.

* * * * *